(12) United States Patent
Rimboeck

(10) Patent No.: US 12,060,376 B2
(45) Date of Patent: Aug. 13, 2024

(54) PROCESS FOR REDUCING THE CONTENT OF BORON COMPOUNDS IN HALOSILANE-CONTAINING COMPOSITIONS

(71) Applicant: WACKER CHEMIE AG, Munich (DE)

(72) Inventor: Karl-Heinz Rimboeck, Heldenstein (DE)

(73) Assignee: WACKER CHEMIE AG, Munich (DE)

( * ) Notice: Subject to any disclaimer, the term of this patent is extended or adjusted under 35 U.S.C. 154(b) by 566 days.

(21) Appl. No.: 17/294,455

(22) PCT Filed: Dec. 7, 2018

(86) PCT No.: PCT/EP2018/084003
§ 371 (c)(1),
(2) Date: May 17, 2021

(87) PCT Pub. No.: WO2020/114609
PCT Pub. Date: Jun. 11, 2020

(65) Prior Publication Data
US 2022/0017546 A1    Jan. 20, 2022

(51) Int. Cl.
*C07F 7/20* (2006.01)
(52) U.S. Cl.
CPC ..................... *C07F 7/20* (2013.01)
(58) Field of Classification Search
CPC ......... C07F 7/20; C07F 5/02; C01B 33/10778
See application file for complete search history.

(56) References Cited

U.S. PATENT DOCUMENTS

| | | | |
|---|---|---|---|
| 4,092,446 A | 5/1978 | Padovani et al. | |
| 4,152,509 A | 5/1979 | Yajima et al. | |
| 4,755,370 A | 7/1988 | Kray et al. | |
| 8,691,055 B2 * | 4/2014 | Ghetti | C01B 33/10778 203/67 |
| 2010/0320072 A1 | 12/2010 | Schwarz et al. | |
| 2011/0150739 A1 | 6/2011 | Seliger et al. | |
| 2011/0184205 A1 | 7/2011 | Rauleder et al. | |
| 2012/0193214 A1 | 8/2012 | Paetzold et al. | |
| 2017/0305939 A1 | 10/2017 | Mohsseni et al. | |

FOREIGN PATENT DOCUMENTS

| | | |
|---|---|---|
| CN | 107835815 A | 3/2018 |
| DE | 102014225460 A1 | 6/2016 |
| EP | 2036858 A2 | 3/2009 |
| EP | 2036858 B1 | 7/2011 |
| EP | 2481708 A1 | 8/2012 |
| WO | 08113619 A2 | 9/2008 |
| WO | 09153090 A1 | 12/2009 |
| WO | 10066487 A1 | 6/2010 |
| WO | 16191441 A1 | 12/2016 |
| WO | 16198264 A1 | 12/2016 |

OTHER PUBLICATIONS

D. Kaufmann 120, Chem. Ber. 853-854 (1987) (Year: 1987).*
H. Gilman, et.al. 75, Alkaline Cleavage of Tetrasubstituted Silanes 4531-4534 (1953) (Year: 1953).*
E. Rochow, 67 Journal of the American Chemical Society, 963-965 (1945) (Year: 1945).*
N.G. Anderson, Practical Process & Research Development, "Chapter 13, Vessel and Mixing", 269-289, (2000) (Year: 2000).*
Kaufmann-English Translation (Year: 2024).*
Zhun, et al. "Reaction of Germanium Tetrachloride with Chloro(phenyl)silanes in the Presence of Aluminum Chloride", Russan Journal of General Chemistry, vol. 75, No. 6, 2005, pp. 867-869.
Wright, Anthony, "The Role of Boron Trichloride In the Synthesis of Phenyltrichlorosilane From Benzene and Trichlorosilane", Journal of Organometallic Chemistry, 145 (1978) pp. 307-314.

* cited by examiner

*Primary Examiner* — Alexander R Pagano
*Assistant Examiner* — Frank S. Hou
(74) *Attorney, Agent, or Firm* — BROOKS KUSHMAN P.C.

(57) ABSTRACT

The content of boron compounds in a composition containing at least one halosilane is reduced by bringing the composition into contact with at least one phenylsilane and removing the at least one halosilane. The invention further relates to the use of phenylsilanes for removing boron compounds from halosilane-containing compositions.

23 Claims, No Drawings

PROCESS FOR REDUCING THE CONTENT OF BORON COMPOUNDS IN HALOSILANE-CONTAINING COMPOSITIONS

CROSS REFERENCE TO RELATED APPLICATIONS

This application is the U.S. National Phase of PCT Appln. No. PCT/EP2018/084003 filed Dec. 7, 2018, the disclosure of which is incorporated in its entirety by reference herein.

BACKGROUND OF THE INVENTION

1. Field of the Invention

The invention relates to a method for reducing the content of boron compounds in a composition containing at least one halosilane, comprising bringing the composition into contact with at least one phenylsilane and removing the at least one halosilane. The invention further relates to the use of phenylsilanes for removing boron compounds from halosilane-containing compositions.

2. Description of the Related Art

Boron-containing by-products can be formed in the production of halosilanes, especially chloro- and organochlorosilanes. Halosilanes are, by way of example, the starting material in the production of polycrystalline silicon (polysilicon, e.g. by the Siemens process). In turn, polysilicon is, inter alia, the raw material in the production of monocrystalline silicon, which is used in the semiconductor industry for the manufacture of electronic components (e.g. diodes, bipolar transistors and MOS transistors). For the targeted influencing of the electrical conductivity, the manufacture of these electronic components usually comprises a localized contamination of the monocrystalline silicon with dopants (e.g. boron, arsenic). It is thus absolutely essential that the polysilicon used as the starting material and the basic materials thereof already have as low a proportion of dopants as possible.

In addition, organochlorosilanes in particular are the starting material in the production of silicones, which inter alia also find application in the field of microelectronics and in the semiconductor industry. Here too, boron can cause significant problems in terms of its property as a dopant.

Typical boron impurities are, for example, the hydrogen and chlorine compounds of boron, especially boron trichloride ($BCl_3$). These can generally be separated from the halosilanes by distillation only with difficulty. The impurities are then at least partially also found in the silicon intermediate/end product (e.g. polysilicon, monocrystalline silicon, silicones). In the scope of quality control, monitoring of the nature and amount of impurities is therefore necessary. By way of example, polysilicon that is used for solar and semiconductor applications should have a concentration of boron of less than 15 ppta.

The production of chlorosilanes, in particular trichlorosilane (TCS), can be effected by three methods that are based on the following reactions (cf. WO 2016/198264 A1):

$$SiCl_4 + H_2 \rightarrow SiHCl_3 + HCl + \text{by-products} \quad (1)$$

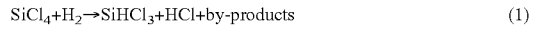

$$Si + 3SiCl_4 + 2H_2 \rightarrow 4SiHCl_3 + \text{by-products} \quad (2)$$

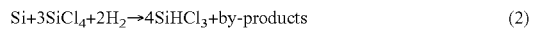

$$Si + 3HCl \rightarrow SiHCl_3 + H_2 + \text{by-products} \quad (3)$$

By-products arising may be further chlorosilanes, for example monochlorosilane ($H_3SiCl$), dichlorosilane (DCS, $H_2SiCl_2$), silicon tetrachloride (STC, $SiCl_4$) and also di- and oligosilanes. In addition, impurities such as hydrocarbons, organochlorosilanes and metal chlorides may also be components of the by-products. Besides the boron impurities that have been mentioned above, compounds of the elements P and As (in particular in the form of their chlorides and hydrogen compounds) may also be a component of the by-products.

The high-temperature conversion (HTC) as per reaction (1) is an endothermic process and is usually effected under high pressure at temperatures between 600 and 900° C.

The low-temperature conversion (LTC) as per reaction (2) is carried out in the presence of a catalyst (e.g. copper-containing catalysts). The LTC can be effected in a fluidized bed reactor in the presence of metallurgical grade silicon ($Si_{mg}$) at temperatures between 400 and 700° C.

In the hydrochlorination (HC) as per reaction (3), chlorosilanes can be produced in a fluidized bed reactor from $Si_{mg}$ with the addition of hydrogen chloride (HCl), with the reaction proceeding exothermically. This generally affords TCS and STC as main products. A method for HC has been disclosed, for example, in U.S. Pat. No. 4,092,446A.

It is customary to purify the TCS obtained as per reactions (1), (2) and (3) by distillation. The removal of boron impurities in particular is technically complex in this case. By way of example, $BCl_3$ (boiling point: 12.4° C.) and dichlorosilane (boiling point: 8.4° C.) can be separated from each other only laboriously. In a distillation system, this small difference in boiling points can lead to dichlorosilane-containing secondary streams containing boron-containing impurities. Since complete removal of the boron-containing impurity would require disproportionately high technical effort, the secondary stream is usually completely withdrawn from the distillation system. A considerable amount of dichlorosilane is therefore also withdrawn together with the boron-containing impurity. This generates considerable costs on account of the disposal and in particular on account of the loss of silicon and chlorine.

The production of organochlorosilanes, especially methylchlorosilanes, is effected in particular by the Müller-Rochow direct synthesis (MRDS, cf. DE 10 2014 225 460 A1):

$$Si + CH_3Cl \rightarrow (CH_3)_n SiCl_{4-n} + \text{by-products, } (n=0\text{-}4) \quad (4)$$

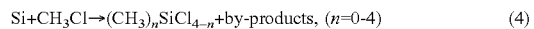

In principle, this involves reacting an organic chlorocarbon compound with $Si_{mg}$, while adding copper catalysts and promoters, to give organochlorosilanes, especially methylchlorosilanes. The main product is usually dichlorodimethylsilane (($CH_3)_2SiCl_2$). Industrially, the reaction is effected in a fluidized bed reactor at a temperature of 260 to 350° C. Boron impurities, which can also be removed by distillation only with relative difficulty here, are also usually among the by-products.

Various approaches are followed in order to achieve effective removal of boron compounds.

WO 2008/113619 describes a method for obtaining boron-enriched chlorosilanes from a boron-containing chlorosilane mixture by means of removing a boron-enriched distillation stream by distillation. By way of various column arrangements and product withdrawals from the top draws or side draws from the still, the boron content in the DCS can in this case be depleted down to approximately 50 ppmw in a substream. However, boron is enriched to an even greater extent in another substream that also contains DCS and TCS. A further disadvantage is that a not inconsiderable amount of TCS is lost.

WO 2009/153090 discloses a method for reducing the boron content in a composition containing silicon halides, wherein in a first step the composition is brought into contact with water. In a second step the hydrolyzed boron compounds are then removed by distillation. Reacting boron halides with water forms higher-boiling hydrolyzates which can be removed by distillation more easily. However, these methods require an additional substream in order to remove the hydrolyzates. Deposits of silica in plant components and corrosion as a result of HCl formed in the process may additionally be problematic. Corrosion can also result in a release of P and As from the steel of the plant.

EP 2 036 858 A2 describes a method in which boron- and phosphorus-containing chlorosilanes are brought into contact with a complexing agent and oxygen. By way of oxidation and complex formation, the boron compounds present in the chlorosilane can be removed. Here, however, considerable amounts of residues with which the boron complex is discharged are formed. A further disadvantage is the relatively long reaction time of up to 30 min. An introduction of organic contaminates may also occur.

WO 2010/066487 describes a method for reducing the boron content of a composition composed of halosilanes, in which the composition is brought into contact with an adsorbent. However, large amounts of adsorbent are required in order to achieve the desired purity, as a result of which the method can become uneconomical, especially since a continuous mode of operation is rarely possible. In addition, the adsorbent has to be regenerated or completely exchanged at regular intervals. The use of adsorbers can furthermore be accompanied by the risk of an introduction of further impurities.

The present invention was based on the object of providing a method for the purification of halosilane mixtures with which the disadvantages known from the prior art are avoided.

SUMMARY OF THE INVENTION

This object is achieved by a method for reducing the content of boron compounds in a composition containing at least one halosilane, comprising the steps of
a) bringing the composition into contact with at least one phenylsilane,
b) removing the at least one halosilane by means of a suitable thermal separation method, in particular distillation,
wherein the phenylsilane is selected from the group comprising the phenylsilanes of general formulae A, B, C and D,

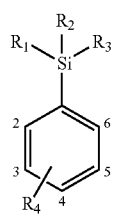

A

-continued

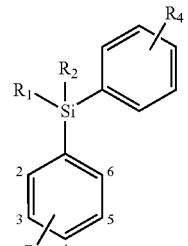

B

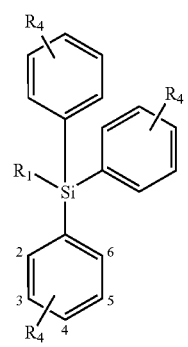

C

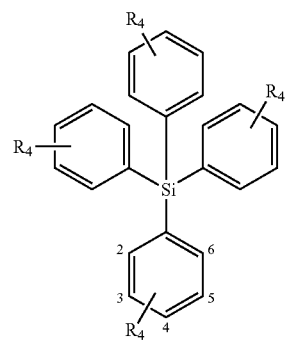

D wherein $R_1$, $R_2$, $R_3$=H, alkyl, F, Cl, Br, I, $R_5$, $OR_5$, where $R_5$=alkyl, aryl, polyether, and
$R_4$=H, alkyl, aryl, F, Cl, Br, I.

DETAILED DESCRIPTION OF THE PREFERRED EMBODIMENTS

The alkyl radical is preferably a radical selected from the group comprising Me, Et, Pr, i-Pr, n-Bu, i-Bu, t-Bu. Alkyl radicals having up to 10 carbon atoms are especially preferred.

The radical $R_4$ can be bonded to one or more of carbon atoms 2 to 6 of the phenyl radical. The phenyl radical can also be substituted by different radicals $R_4$.

Within the context of the present invention, "halosilane" is also in particular to be understood to mean organohalosilanes in which the silicon bears at least one organyl radical, for example $Me_nH_mSiCl_{4-n-m}$ where n=0 to 4 and m=0, 1, and $Me_nSi_2Cl_{6-n}$, where n=1 to 6.

Preferably, at least one phenylsilane selected from the group comprising phenylsilanes of general formulae A, B, C and D, wherein $R_4$=H and $R_1$, $R_2$, $R_3$=H, Cl, Me, Et, Ph, is involved.

The phenylsilane is very preferably selected from the group comprising the phenylsilanes A1, A2, A3, A4, A5 and A6.

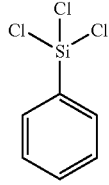

A1

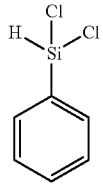

A2

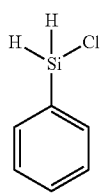

A3

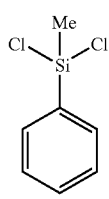

A4

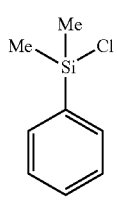

A5

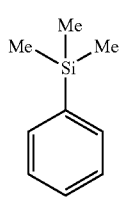

A6

It has been found that boron compounds, especially the halogen compounds of boron, are converted into compounds which are higher boiling, as compared to STC (boiling point: 57.7° C.) by being brought into contact with phenylsilanes. The reaction scheme is shown below using the reaction of BCl$_3$ with the phenylsilanes A1 and A5 as an example.

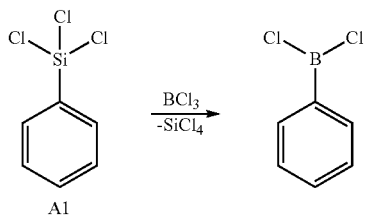

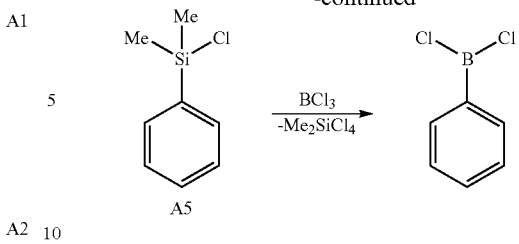

The boiling point of phenylsilane A1 is approximately 201° C., that of phenylsilane A5 approximately 197° C. The boron-phenyl compound obtained after the reaction has a boiling point of about 175° C. This is thus markedly higher than that of conventional halosilanes, as a result of which removal of the halosilanes by distillation is facilitated considerably. The conversion of the boron compound is usually quantitative. By-products of the reaction are useful chlorosilanes (e.g. STC, Me$_2$SiCl$_2$). There is no loss of valuable halosilanes as for example with complexation, adsorption or hydrolysis methods or purely distillative methods for the removal of boron.

The thermal separation method preferably comprises a distillation. In particular, the separation method is a distillation.

By preference, the halosilane removed in step b) has a boron content of less than 1 ppmw, preferably less than 0.5 ppmw, more preferably less than 0.1 ppmw, and especially less than 0.01 ppmw.

The phenylsilane is selected by preference such that its boiling point is above 145° C., more preferably 145 to 250° C., and most preferably 150 to 201° C. It is particularly advantageous that the phenylsilane is selected depending on the composition to be purified, that is to say in particular is adapted to the boiling point of the halosilane present in the composition.

The phenylsilane is used by preference in an amount of 1 ppmw to 5% by weight, more preferably 100 ppmw to 3% by weight, yet more preferably 10 ppmw to 2% by weight, and especially 1 ppmw to 1% by weight, based on the amount of chlorosilane in the composition. It may be advantageous in principle to use the phenylsilane in excess, based on the approximate amount of boron to be expected in the composition. The metering of the phenylsilane can therefore advantageously be adapted to requirements. By way of example, the boron content in the composition can be constantly checked by way of monitoring (e.g. by means of on-line TOF-MS) and the amount of phenylsilane supplied in step a) can be constantly adapted depending on the measured boron concentration.

It is fundamentally unimportant for the execution of the method whether the phenylsilane in step a) is brought into contact with a gaseous or with a liquid composition. The state of matter of the phenylsilane typically corresponds to that of the composition. On account of the relatively high boiling points of the phenylsilanes, they are brought into contact preferably in liquid form. The phenylsilane can also be added in solid form to a liquid composition. By way of example, the appropriate phenylsilane can be added in liquid or solid form during and/or after the condensation of a halosilane mixture.

For example, the phenylsilane can also be a component of a quench medium in a cooling/condensation apparatus (what is referred to as a quench cooler/column), where the quench medium used is a liquid chlorosilane mixture (preferably corresponding to the chlorosilane product spectrum of the respective reaction). A chlorosilane-containing off-gas from a reactor for the production of chlorosilanes can then, instead of a conventional condensation, be cooled down in this quench medium and finally the products therein can be condensed out. Quenching processes can thus be connected in series with a temperature gradient in order to condense out chlorosilanes in the most efficient manner possible. The temperature range for such quenching processes is usually −40 to 120° C.

Method step a) is by preference carried out at a temperature of −80° C. to 600° C., more preferably −60 to 450° C., and most preferably −40 to 350° C.

The halosilane is preferably removed in method step b) by means of distillation, in particular by means of rectification in a distillation apparatus, with the halosilane being removed as a low boiler. Distillation apparatuses of this kind are known in principle to those skilled in the art. Reference may be made here, by way of example, to EP 2 481 708 A1. It is advantageous that the distillation can be can be conducted in regular operation. In principle, no specific reflux ratios matched to the boron content of the composition are necessary, by way of which the apparatus complexity can be considerably simplified. Usually, it is even possible for a distillation step to be omitted and operation of one entire column to be dispensed with.

In known methods for the distillative removal of boron compounds from halosilane compositions, DCS, which has a boiling point of 8.3° C., is usually withdrawn together with boron trichloride (boiling point 12.5° C.) as low boilers. A disadvantage with this is that DCS, as a valuable silicon compound, is lost from the product of value, since a separation of boron trichloride and DCS is very complex and thus not economically expedient. By means of the inventive method, this loss of silicon compound can be minimized as the boiling point of the boron-phenyl compounds lies far above that of the customary halosilanes.

In principle, other single-stage or multi-stage separation methods making use of the physical and/or chemical properties of the individual components of the composition can also be used for the removal of the at least one halosilane. Examples that may be mentioned include sublimation and extraction. In addition, mechanical separation methods based on different mechanical material properties such as density, particle size, surface wettability and particle inertia may also be used (e.g. filtration, centrifugation, flotation). Removal as a consequence of chemical reactions such as, for example, precipitation and ion exchange is also conceivable. Accordingly, it may also be preferable that the boron-phenyl compound obtained by reaction with the phenylsilane in step a) is removed in step b).

Step a) and/or step b) are preferably carried out continuously. By way of example, the phenylsilane can be continuously supplied to a gas or liquid stream of the composition and the composition then subjected to a distillation.

Delimited reaction spaces, such as for example in loop reactors, delay tanks equipped with a circulating pump, or stirring apparatuses, can also be provided for carrying out step a).

The contact time in step a) can be in a range from 1 sec to 12 h, preferably 1 min to 6 h, more preferably 5 min to 1 h.

The pressure range at which method steps a) and/or b) are carried out is preferably 0.01 to 1 MPa, particularly preferably 0.05 to 0.5 MPa, especially 0.1 to 0.4 MPa.

Optionally, prior to step a), after step b) and/or between steps a) and b), a further, preferably mechanical, separation method is carried out. In this way, for example, any solids formed (e.g. aluminum chloride) can be removed. Preferably, however, method step b) immediately follows method step a), that is to say there are no further steps between a) and b).

The halosilane is preferably selected from the group comprising the chlorosilanes of general formulae $H_nSiCl_{4-n}$, $H_mCl_{6-m}Si_2$, $(CH_3)_nSiCl_4$, where n=1 to 4 and m=0 to 4, $(CH_3)_nH_mSiCl_{4-n-m}$ where n=0 to 4 and m=0, 1, and $Me_nSi_2Cl_{6-n}$, where n=1 to 6.

The composition preferably comprises chlorosilanes, especially TCS and/or DCS, and/or methylchlorosilanes, especially dimethyldichlorosilane. The composition can consist exclusively of at least one halosilane.

The boron compounds are preferably halogen compounds, in particular chlorine compounds, of boron. Most preferably, they are monochloroborane, dichloroborane, boron trichloride or mixtures thereof.

The impurity is in principle present fully dissolved in the composition.

In accordance with a preferred embodiment of the method, the composition is a product stream from the production of chlorosilane by the HTC process (reaction (1)), LTC process (reaction (2)) or HC process (reaction (3)). As an alternative, it may be a product stream from the production of organochlorosilane by MRDS (reaction (4)).

The phenylsilane can in principle be present, or brought into contact with the halosilane-containing composition, at a plurality of locations, optionally under different boundary conditions. By way of example, it can be added a first time directly into a gas stream after (downstream of) a fluidized bed reactor (temperature e.g. 300° C.), a second time after (downstream of) a first condensation stage (temperature e.g. 60° C.), and a third time after (downstream of) a low-temperature condensation stage (temperature e.g. −10° C.). The quenching process described can also be used in a temperature range between −40 and 120° C.

Preferably, steps a) and b) are incorporated into an integrated system for the production of polysilicon or into an integrated system for the production of silicones.

The integrated system preferably encompasses the following processes:

Production of technical-grade TCS (reaction (1), (2) or (3)) or methylchlorosilanes (reaction (4)), purification of the TCS produced or of the methylchlorosilanes using the inventive method; deposition of semiconductor-grade polysilicon, preferably by means of the Siemens process or as granules, or production of silicones.

A further aspect of the invention relates to the use of the described phenylsilanes of general formulae A, B, C and D for removing boron compounds from compositions containing at least one halosilane. With regard to preferably selected phenylsilanes, reference can be made to the statements above.

EXAMPLES

For the halosilane-containing composition that was contaminated with a boron compound, the following sample was used: A composition composed of chlorosilanes and obtained by reaction of commercially available $Si_{mg}$ (boron content 59 ppmw) with hydrogen chloride gas in a fluidized bed reactor at around 350 to 400° C. (reaction (3)). After a low-temperature condensation at −60° C., the following composition was found by means of GC and ICP-OES analyses: 84% by weight of TCS, 12% by weight of STC, 0.8% by weight of DCS and 43 ppmw of boron. Further impurities present were methylchlorosilanes, hydrocarbons and high boilers, for example siloxanes and disilanes, which do not, however, need to be taken into consideration for the execution of the method.

COMPARATIVE EXAMPLE

A portion of the composition described was subjected to distillation under a protective gas atmosphere, where the temperature of the gas phase was 75° C. (at 0.15 MPa absolute) and was not exceeded. The distillation apparatus can be, for example, a Vigreux column in combination with a Liebig condenser (laboratory scale). The gas stream was condensed at −60° C. The boron content was in each case determined for both the distillate and the residue. This showed that, of the original 43 ppmw, 99% of the boron had gone into the distillate and 1% thereof had remained in the residue.

EXAMPLE

The other portion of the composition described was admixed with the phenylsilane A1 (0.5% by weight based on the total amount of the sample), under a protective gas atmosphere at a temperature of 0° C., and stirred for 30 minutes. The mixture obtained was subjected to a simple distillation under a protective gas atmosphere, where the temperature of the gas phase was 75° C. (at 0.15 MPa absolute) and was not exceeded. The gas stream was condensed at −60° C. The boron content was determined for both the distillate and the residue. This showed that, of the original 43 ppmw, only less than <1% of the boron had gone into the distillate and more than 99% thereof had remained in the residue.

In accordance with this example, the composition described was admixed with the phenylsilanes stated in table 1 and analyzed after distillation and condensation.

TABLE 1

| Phenylsilane | Proportion of boron in the distillate | Proportion of boron in the residue |
| --- | --- | --- |
| A2 | <1% | >99% |
| A3 | 2% | 98% |
| A4 | 2% | 98% |
| A5 | 3% | 97% |
| A6 | 4% | 96% |
| Formula B where $R_1 = R_2 = Cl, R_4 = H$ | 5% | 95% |
| Formula B where $R_1 = H, R_2 = Cl, R_4 = H$ | 7% | 93% |
| Formula B where $R_1 = R_2 = H, R_4 = H$ | 13% | 87% |
| Formula C where $R_1 = Cl, R_4 = H$ | 18% | 82% |
| Formula D where $R_4 = H$ | 27% | 73% |

These results could be carried over to all boron-containing chlorosilanes that were produced by means of the LTC process, HTC process, MRDS.

The invention claimed is:

1. A method for purifying a composition containing at least one halosilane, comprising reducing a content of boron in the composition, by:
   a) bringing the composition into contact with at least one phenylsilane,
   b) removing the at least one halosilane by means of a thermal separation method, wherein the phenylsilane is selected from the group consisting of the phenylsilanes of formulae A, B, C, and D, and mixtures thereof

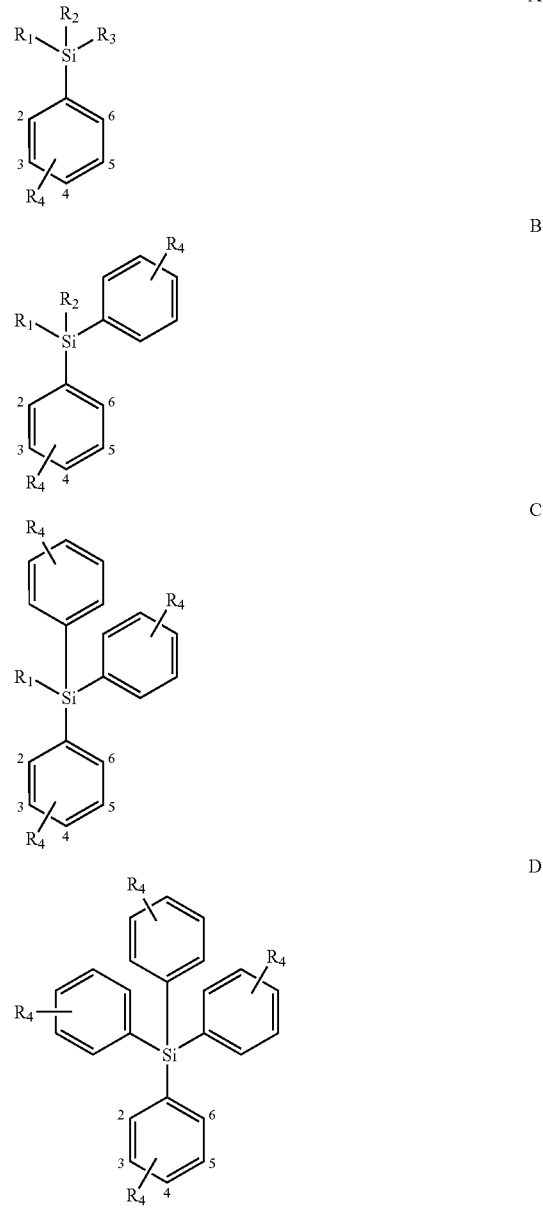

wherein $R_1$, $R_2$, $R_3$ each individually, are H, F, Cl, Br, I, aryl, polyether or $OR_5$, where $R_5$ each individually is alkyl, aryl, or polyether, and $R_4$ each individually is H, alkyl, aryl, F, Cl, Br, or I, and wherein the halosilane is selected from the group comprising the chlorosilanes of general formulae $H_nSiCl_{4-n}$, $H_mCl_{6-m}Si_2$, $(CH_3)_nSiCl_{4-n}$ where n=1-3 and m=0-4, $(CH_3)_nH_mSiCl_{4-n-m}$ where n=0-3 and m=0 or n=0-2 and m=1, and $Me_nSi_2Cl_{6-n}$ where n=1-5; and the boron compounds are halogen compounds of boron.

2. The method of claim 1, wherein $R_4$=H and $R_1$, $R_2$, $R_3$ each individually are H, Cl, Me, Et, or Ph.

3. The method of claim 1, wherein at least one phenylsilane is selected from the group consisting of the phenylsilanes A1, A2, and A3,

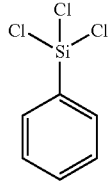
A1

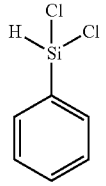
A2

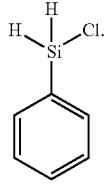
A3

4. The method of claim 1, wherein the thermal separation method comprises a distillation.

5. The method of claim 1, wherein the halosilane removed in step b) has a boron content of less than 1 ppmw.

6. The method of claim 1, wherein the halosilane removed in step b) has a boron content of less than 0.1 ppmw.

7. The method of claim 1, wherein the halosilane removed in step b) has a boron content of less than 0.01 ppmw.

8. The method of claim 1, wherein the boiling point of the phenylsilane is above 145° C.

9. The method of claim 1, wherein the boiling point of the phenylsilane is from greater than 145° C. and up to 250° C.

10. The method of claim 1, wherein the boiling point of the phenylsilane is from greater than 150° C. and up to 201° C.

11. The method of claim 1, wherein the phenylsilane is used in an amount of 1 ppmw to 5% by weight, based on the amount of chlorosilane.

12. The method of claim 1, wherein the phenylsilane is used in an amount of 100 ppmw to 3% by weight, based on the amount of chlorosilane.

13. The method of claim 1, wherein the phenylsilane is used in an amount of 1 ppmw to 1% by weight, based on the amount of chlorosilane.

14. The method of claim 1, wherein step a) is carried out at a temperature of −80 to 600° C.

15. The method of claim 1, wherein step a) is carried out at a temperature of −40 to 350° C.

16. The method of claim 1, wherein step a) and/or step b) is carried out continuously.

17. The method of claim 1, wherein the phenylsilane is present as a constituent of a quench gas for cooling a chlorosilane off-gas from a reactor for preparing chlorosilanes.

18. The method of claim 1, wherein step a) takes place at a temperature of from −80° C. to 60° C.

19. The method of claim 1, wherein the composition is a product stream from the production of chlorosilane by low-temperature conversion, high-temperature conversion, or hydrochlorination.

20. A process for removing boron compounds from a composition containing at least one halosilane, comprising contacting the composition with at least one phenylsilane of formulae A, B, C or D,

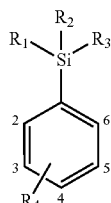
A

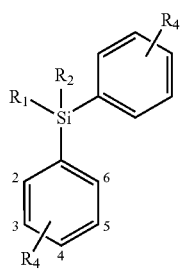
B

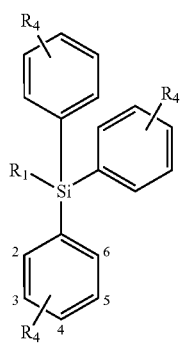
C

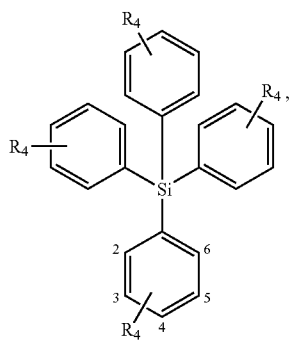
D and removing a boron-containing reaction product of the boron compounds with the phenylsilane(s), wherein $R_1$, $R_2$, $R_3$=H, F, Cl, Br, I, aryl, polyether or $OR_5$, where $R_5$=alkyl, aryl, polyether, and $R_4$=H, alkyl, aryl, F, Cl, Br, I; and wherein the halosilane is selected from the group consisting of the chlorosilanes of the formulae $H_nSiCl_{4-n}$, $H_mCl_{6-m}Si_2$, $(CH_3)_nSiCl_{4-n}$ where n=1-3 and m=0-4, $(CH_3)_nH_mSiCl_{4-n-m}$ where n=0-3 and m=0 or where n=0-2 and m=1, and $(CH_3)_nSi_2Cl_{6-n}$ where n=1-5 and mixtures thereof; and wherein the boron compounds are halogen compounds of boron.

21. The process of claim 20, wherein $R_4$ each individually is H or $R_1$, and $R_2$, $R_3$ each individually are H, Cl, Me, Et, or Ph.

22. The process of claim 20, wherein at least one phenylsilane is selected from the group consisting of the phenylsilanes A1, A2, and A3

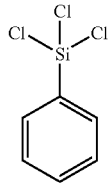

A1

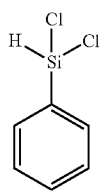

A2

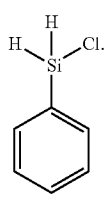

A3

23. A method for purifying a chlorosilane-containing composition from a commercial manufacture of chlorosilanes, comprising removing boron from the composition, by:
   a) bringing the composition into contact with at least one phenylsilane, and
   b) removing at least one halosilane by means of a distillative separation method,
   wherein the phenylsilane is selected from the group consisting of the phenylsilanes of formulae A, B, C, and D, and mixtures thereof

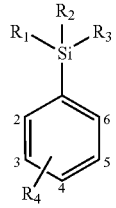

A

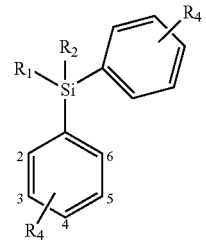

B

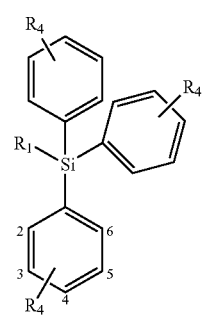

C

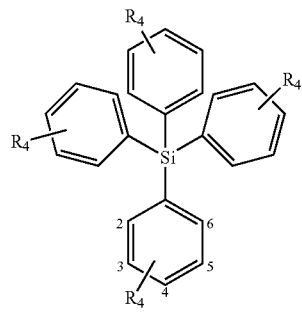

D wherein $R_1$, $R_2$, $R_3$ each individually, are H, F, Cl, Br, I, aryl, polyether or $OR_5$, where $R_5$ each individually is alkyl, aryl, or polyether, and $R_4$ each individually is H, alkyl, aryl, F, Cl, Br, or I.

* * * * *